United States Patent [19]

Kanazawa et al.

[11] Patent Number: 4,817,986
[45] Date of Patent: Apr. 4, 1989

[54] VEHICLE BODY ASSEMBLY USED IN COMMON FOR TWO-WHEEL-AND FOUR-WHEEL-STEERING VEHICLES

[75] Inventors: Hirotaka Kanazawa, Hiroshima; Akira Marumoto, Kure; Kouji Tsuji, Hiroshima, all of Japan

[73] Assignee: Mazda Motor Corporation, Hiroshima, Japan

[21] Appl. No.: 177,933

[22] Filed: Apr. 5, 1988

[30] Foreign Application Priority Data

Apr. 6, 1987 [JP] Japan .................................. 62-83031

[51] Int. Cl.4 ............................................. B62D 21/00
[52] U.S. Cl. ................................... 280/781; 180/312; 280/716
[58] Field of Search ....................... 280/781, 788, 716; 180/311, 312

[56] References Cited

U.S. PATENT DOCUMENTS

| 4,106,807 | 8/1978 | Sakurai | 280/787 |
| 4,263,980 | 4/1981 | Harlow, Jr. et al. | 180/312 |
| 4,453,740 | 6/1984 | von der Ohe et al. | 180/312 |
| 4,714,132 | 12/1987 | Hattori et al. | 280/716 |
| 4,720,120 | 1/1988 | Shimatani et al. | 280/716 |
| 4,723,791 | 2/1988 | Miura et al. | 280/716 |

FOREIGN PATENT DOCUMENTS 629076 2/1987 Japan .

Primary Examiner—Kenneth R. Rice
Attorney, Agent, or Firm—Fleit, Jacobson, Cohn & Price

[57] ABSTRACT

The present invention relates to a suspension system in a vehicle body assembly which is used in common for a four-wheel-steering vehicle and a two-wheel-steering vehicle. In the present invention, a front suspension system installed in a four-wheel-steering vehicle is set to have a higher lateral rigidity than when installed in a two-wheel-steering vehicle, so that the front suspension system can withstand the lateral forces acting on the front wheels of the four-wheel-steering vehicle, said lateral forces being larger than those in a two-wheel-steering vehicle. Further, the suspension system is set to have a lowered rigidity against rolling of the vehicle body where it is installed in a four-wheel-steering vehicle, whereby the riding comfort can be maintained as that of the two-wheel-steering vehicle. In addition, a front steering mechanism installed in a four-wheel-steering vehicle is set to have a steering ratio which is smaller than where it is installed in a two-wheel-steering vehicle, by which even when the rear wheels are steered in the same direction as the front wheels, the four-wheel-steering vehicle can be handled in the same manner as the two-wheel-steering vehicle.

15 Claims, 7 Drawing Sheets

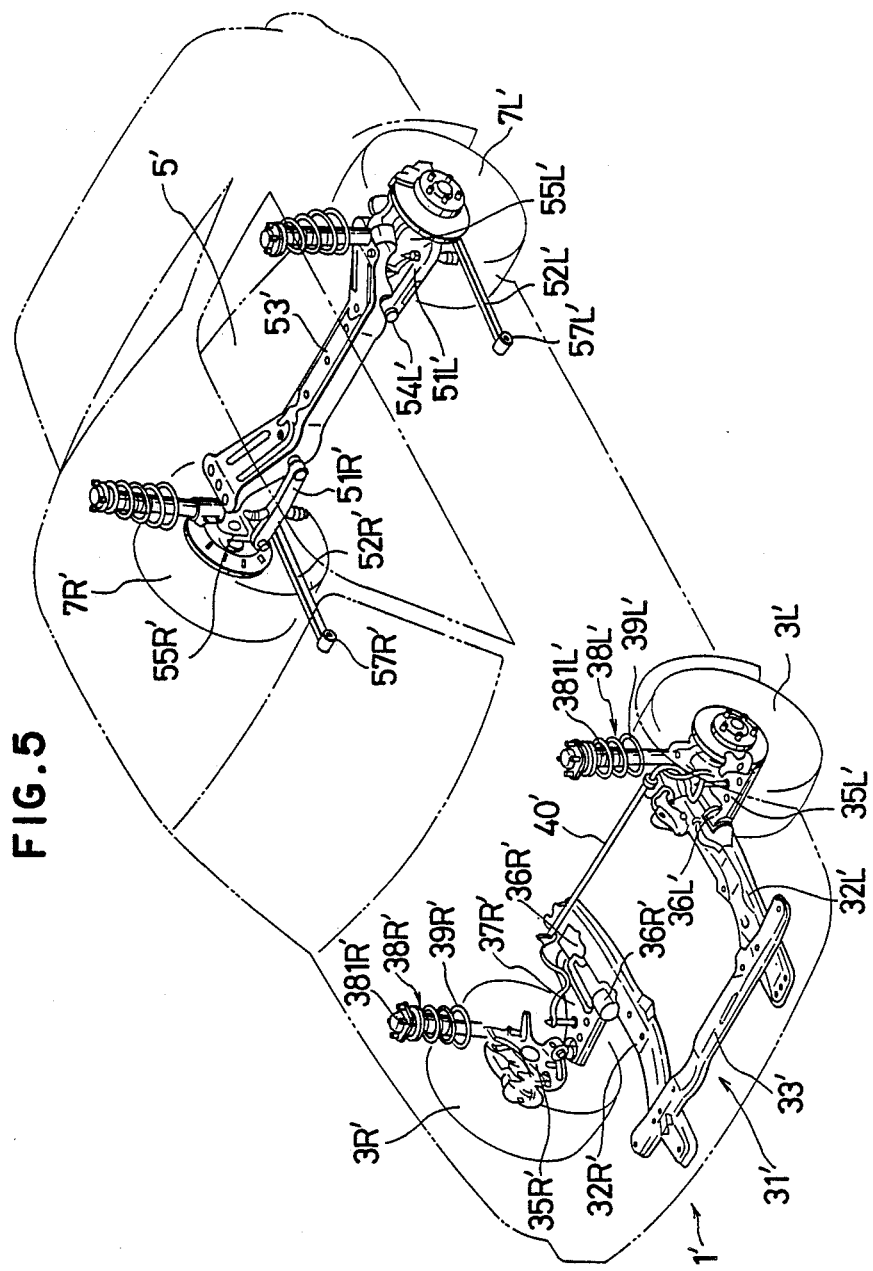

FIG.6A
FIG.6B    FIG.6C
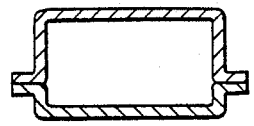    
FIG.7A
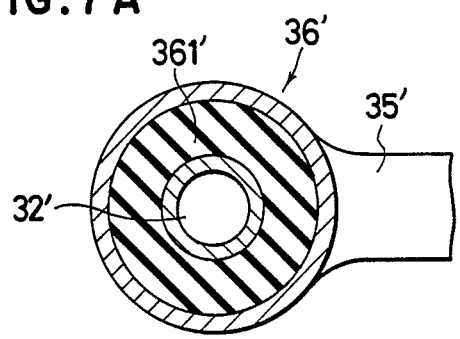
FIG.7B
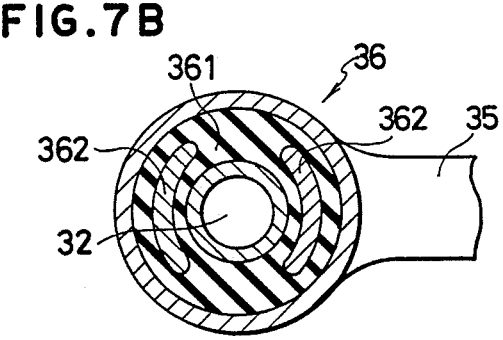

VEHICLE BODY ASSEMBLY USED IN COMMON FOR TWO-WHEEL-AND FOUR-WHEEL-STEERING VEHICLES

BACKGROUND OF THE INVENTION

1. Field of the Invention

The present invention relates to a vehicle body assembly which is commonly used for a four-wheel-steering vehicle and a two-wheel-steering vehicle. More specifically, the present invention pertains to a suspension system and/or a steering system which are incorporated in such a commonly used vehicle body assembly.

2. Description of the Prior Art

It has been known that there are two types vehicles in terms of steering system provided therewith. One is provided with a two-wheel steering system for front wheels, which is usually referred to as a 2-WS vehicle, whereas the other is provided with a four-wheel steering system for rear wheels as well as front wheels and is referred to as a 4-WS vehicle. The 4-WS vehicle has improved turning ability and a driving stability compared to a 2-WS vehicle especially in high-speed turning conditions. An example of a 4-WS vehicle is disclosed in Japanese Publication No. 62-9076, wherein a vehicle has a four-wheel steering apparatus for steering rear wheels in response to the steering of the front wheels. In a typical 4-WS vehicle th rear wheels are steered in the same direction as the front wheels at a relatively high vehicle speed, so that the lateral forces are applied to the rear wheels as well as the front wheels when cornering, which allows the vehicle attitude to be maintained along a tangential line of a turning circle in good response to the operation of the steering wheel. Thus, lane changes at high speed and the like can be carried out smoothly. Where the vehicle speed is low, the rear wheels are steered in the opposite direction to the front wheels so that the vehicle can be turned in a small radius, which is useful when making U-turns and parking.

As described above, when a 4-MS vehicle turns at high speed, both the front wheels and the rear wheels are steered in the same phase, so lateral forces are applied to the rear wheels as well as the front wheels which causes the lateral forces applied to the front wheels to be greater than those applied to the front wheels of a 2-WS vehicle at the same running condition. Furthermore, since the rear wheels are steered in the same phase as the front wheels at a high vehicle speed it is required to turn the steering wheel further in a 4-WS vehicle than in a 2-WS vehicle in order to negotiate the same curve at high speed. This also causes an increase in the lateral forces applied on the front wheels of a 4-WS vehicle when the vehicle turns at high speed. Considering the fact that a 4-WS vehicle has more driving stability and tends to be driven at a higher speed when cornering, the front wheels are subjected to much larger lateral forces than the front wheels of a 2-WS vehicle. Accordingly, a 4-WS vehicle should have a front-wheel suspension system which is stronger than that of a 2-WS vehicle so as to withstand the larger lateral forces applied on the front wheels.

In terms of rolling of a vehicle body, it is smaller in a 4-WS vehicle than in a 2-WS vehicle under the same turning condition. The reason is that a four-wheel steering system allows a vehicle to maintain its attitude with four wheels during turning, so the amount of slip of the vehicle body away from its line of movement is smaller in a 4-WS vehicle than it is in a 2-WS vehicle. Therefore, lateral acceleration on a 4-WS vehicle body when turning tends to be lower than that on a 2-WS vehicle body, so the 4-WS vehicle body rolls less than a 2-WS vehicle body. This means that the degree of rigidity against rolling of the suspension system in a 4-WS vehicle can be lower than that of the suspension system in a 2-WS vehicle.

It has also been known for the two types of vehicles to be marketed under the same brand name. In such cases, the vehicles have almost the same vehicle structures in terms of size and members of the body, suspension system, and front steering system. This commonly-used vehicle structure has been proposed mainly for saving on manufacturing costs. Usually this type of body structure is designed for a 2-WS vehicle. However, where the commonly-used vehicle structure is directly adapted for a 4-WS vehicle, there arises a risk that the front suspension system thereof will not have enough strength to bear the lateral forces on the front wheels, these lateral forces being much larger than in the case of a 2-WS vehicle, as mentioned above. Hence, undesirable deformation may be produced in suspension members and undesirable vibration in the front suspension system. On the contrary, when the commonly-used vehicle body is adapted for a 4-WS vehicle, the front suspension system thereof exhibits too high a rigidity against rolling of the vehicle body, which adversely effects riding comfort. Further, where a front steering system is adopted to a 4-WS vehicle so that rear wheels are steered in the same phase as front wheels, during high-speed turning the driver has to operate a steering wheel more than in a 2-WS vehicle. Therefore, a driver cannot expect to handle 4-WS and 2-WS vehicles in the same manner at a high-speed turning.

SUMMARY OF THE INVENTION

It is therefore an object of the present invention to provide a method of adjusting a vehicle body assembly used in common for a two-wheel-steering vehicle and a four-wheel-steering vehicle so that it is suitable for both two- and four-wheel-steering vehicles.

Another object of the present invention is to provide a method of adjusting suspension characteristics of a suspension system of a commonly-used vehicle body assembly for a 2-WS and a 4-WS vehicle so that it has desirable characteristics for a four-wheel-steering vehicle as well as a two-wheel-steering vehicle.

Still another object of the present invention is to provide a method of adjusting a steering system of a commonly-used vehicle body assembly commonly used for a 2-WS and a 4-WS vehicle so that it has a desired steering ratio for a four-wheel-steering vehicle as well as a two-wheel-steering vehicle.

In order to achieve the above objects, according to the present invention, a front suspension system of a vehicle body assembly commonly used for a 2-WS and a 4-WS vehicle is adjusted to have a higher rigidity in the lateral direction of a vehicle body when provided on a 4-WS vehicle. An example of a common-use front suspension system comprises sub-frame construction in which suspension arms swingably support the front wheels. This type of suspension system can be adjusted to have sufficient rigidity in the lateral direction of the vehicle body for a 4-WS vehicle by increasing the sub-frame rigidity. The increase in rigidity of the sub-frame can be obtained by adding one or more reinforcement members in the lateral direction or by using members that are thicker or have a larger cross-sectional are to constitute the sub-frame. Using rubber bushing means with stiffer resilience to connect portions of suspension lateral links with the vehicle body can also give the suspension system higher rigidity in the lateral direction. According to the present method, a front suspension system is set to have sufficient rigidity for a 4-WS vehicle, especially in the lateral direction, so that undesired deformation of suspension members or vibrations hereof due to lack of rigidity can be avoided.

In one aspect of the present invention, there is provided a method of adjusting rigidity against rolling of a vehicle body so as to suit a 4-WS vehicle. In the present method, where a common-use suspension system for 2-WS and 4-WS vehicles is mounted on a 4-WS vehicle its rigidity against rolling is set lower than the original setting for a 2-WS vehicle. Lowering of the rigidity against rolling can be obtained by setting a stabilizer of a suspension system to have a lower spring constant. Alternatively, a coil spring or a shock absorber provided between a vehicle body and an upsprung member (wheel-side portion) can be set to have a lower spring constant or a lower damping force. According to the present invention, a suspension system of a 4-WS vehicle exhibits a lower rigidity against rolling and gives improved riding comfort as well as driving stability especially during turning.

In still another aspect of the present invention, there is provided a method of adjusting a steering ratio of a front-wheel steering mechanism which is commonly used for a 2-WS and a 4-WS vehicle so that when turning at high speed a driver can operate the steering wheel in the same manner when the front steering mechanism is used in a 4-WS vehicle or a 2-WS vehicle. In a 4-WS vehicle the rear wheels are steered in the same phase as the front wheels at high speed, so it is required to operate the steering wheel more in a 4-WS vehicle than in a 2-WS vehicle when turning at high speed. To avoid such a difference in operation of the steering mechanism the steering ratio of the steering mechanism mounted in a 4-WS vehicle is set to be lower than when it is mounted in a 2-WS vehicle. Accordingly, in response to the same amount of steering wheel operation, the steering angle of the wheels in a 4-WS vehicle is larger than that in a 2-WS vehicle, whereby a driver can operate the steering wheel in a 4-WS vehicle in the same manner as in a 2-WS vehicle.

Other objects and advantages of the invention will become apparent upon reading the following detailed description.

BRIEF DESCRIPTION OF THE DRAWINGS

FIG. 5 shows a suspension system of a vehicle body assembly in common use for two-and four-wheel-steering vehicles, which is adapted for a 2-WS vehicle;

FIG. 6A is a cross-sectional view of a sub-frame member of FIG. 5;

FIG. 6B is a cross-sectional view of an example of a sub-frame member of FIG. 1;

FIG. 6C is a cross-sectional view of an example of a sub-frame member of FIG. 1;

FIG. 7A is a cross-sectional view of a rubber bushing means in a suspension system of the vehicle body assembly of FIG. 5;

FIG. 7B is a cross-sectional view of an example of a rubber bushing means in a suspension system of the vehicle body assembly in FIG. 1;

DESCRIPTION OF THE PREFERRED EMBODIMENT

While the invention will be described in connection with preferred embodiments, it will be understood that we do not intend to limit the invention to this embodiment. On the contrary, we intend to cover all alternatives, modifications, and equivalents as may be included within the spirit and scope of the invention as defined by the attached claims.

Figure 1:
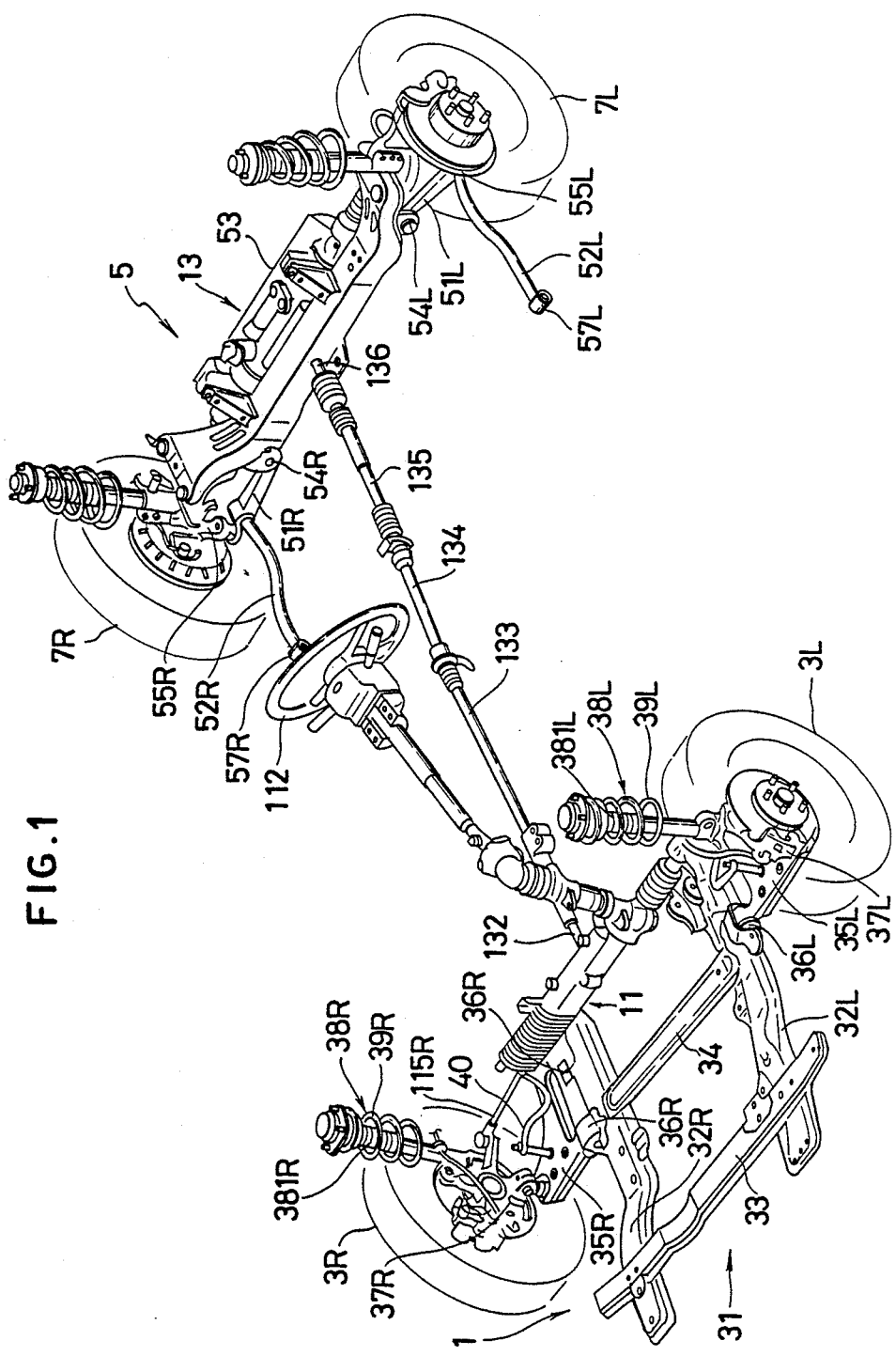
FIG. 1 shows an embodiment according to the present invention of a vehicle body assembly in common-use for a 2-WS vehicle and a 4-WS vehicle, which is adapted for a 4-WS vehicle and has desirable suspension and steering characteristics.

With reference to FIG. 1, there is shown a suspension system mounted on a 4-WS vehicle. Two-wheel-steering and four-wheel-steering vehicles, which are on the market under the same brand name, have vehicle structures in common which have almost the same body sizes and members, suspension systems and front steering mechanisms. The suspension system shown is of this type and has been modified according to the present invention. An original suspension system before modification is shown in FIG. 5.

The modified front suspension system shown in FIG. 1 is given a high rigidity in the lateral direction than that of the original suspension system by the addition of an additional member 34 in the lateral direction.

In FIG. 1, the modified suspension system is incorporated of a front suspension system 1 for front wheels 3L, 3R and a rear suspension system 5 for rear wheels 7L, 7R. The front suspension system 1 has a sub-frame 31 which comprises a pair of longitudinal members 32L, 32R extending in the longitudinal direction of a vehicle body. The longitudinal members 32L, 32R are disposed inside a pair of side frames (not shown) of the vehicle body and are connected at their ends by a front cross member and a dash cross member (not shown) of the vehicle body via resilient members such as rubber bushing means. The sub-frame 31 also has a lateral member 33 extending in the lateral direction of the vehicle body and affixed at both end portions to the front side portions of the longitudinal members 32L, 32R. The ends of the lateral member 33 extends beyond the longitudinal members 32L, 32R and are connected with the side-frames of the vehicle body via resilient members. The sub-frame 31 is provided with an additional member 34 disposed to rear of and parallel to the lateral member 33 and the ends of which are attached to the longitudinal members 32L, 32R.

Figure 8:
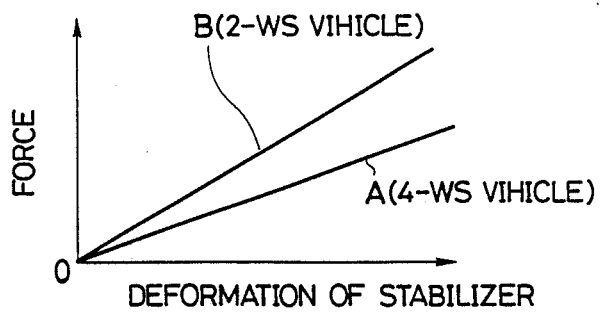
FIG. 8 illustrates characteristic curves of a stabilizer.

The front suspension system 1 comprises A-shaped suspension arms 35L, 35R extending laterally which are supported swingably in the vertical direction at their inner ends on the longitudinal members 32L, 32R via rubber bushing means 36L, 36R, respectively. The suspension arms 35L, 35R are connected rotatably at their outer ends with support members 37L, 37R of the front wheels 3L, 3R. The front suspension system 1 is also provided with struts 38L, 38R having shock absorbing means 381L, 381R therein, coil springs 39L, 39R disposed around the struts, and a stabilizer 40 for suppressing rolling of the vehicle body. The stabilizer 40 has a rigidity against rolling which is lower than that in the original suspension system. The characteristic of the stabilizer 40 is illustrated by line A in FIG. 8, and that in the original suspension system by line B. As can be seen from the characteristic lines A and B, the stabilizer 40 exhibits lower rigidity against rolling.

The rear suspension system 5 comprises I-shape suspension arms 51L, 51R and trailing arms 52L, 52R. The suspension arms 51L, 51R extend laterally between a crossmember 53 of the vehicle body and the rear wheels 7L, 7R, respectively. The inner ends of the suspension arms 51L, 51R are connected swingably in the vertical direction via rubber bushing means 54L, 54R and the outer ends thereof are connected rotatably with support members 55L, 55R of the rear wheels 7L, 7R. The trailing arms 52L, 52R of the rear wheels 7L, 7R. The trailing arms 52L, 52R each extend longitudinally in front of the respective rear wheel and each is connected at its rear end with the suspension arms 51L, 51R, respectively. The trailing arms are connected at their front ends with the vehicle body through rubber bushing means 57L, 57R.

The modified suspension system has the same construction as the original suspension system except for the provision of the additional lateral member 34 to increase the rigidity of the front suspension, and the stabilizer 40 having a rigidity against rolling which is lower than that in the original suspension system. Therefore, the front suspension of the modified suspension system can withstand a larger lateral force applied to the front wheels by a high-speed turning of the vehicle and so do not exhibit undesirable deformation of suspension members or vibrations thereof. In addition, since the rigidity against rolling of the stabilizer 40 is set to be lower than that in the original suspension system (FIG. 8) the riding comfort of the 4-WS vehicle can be maintained.

Figure 2:
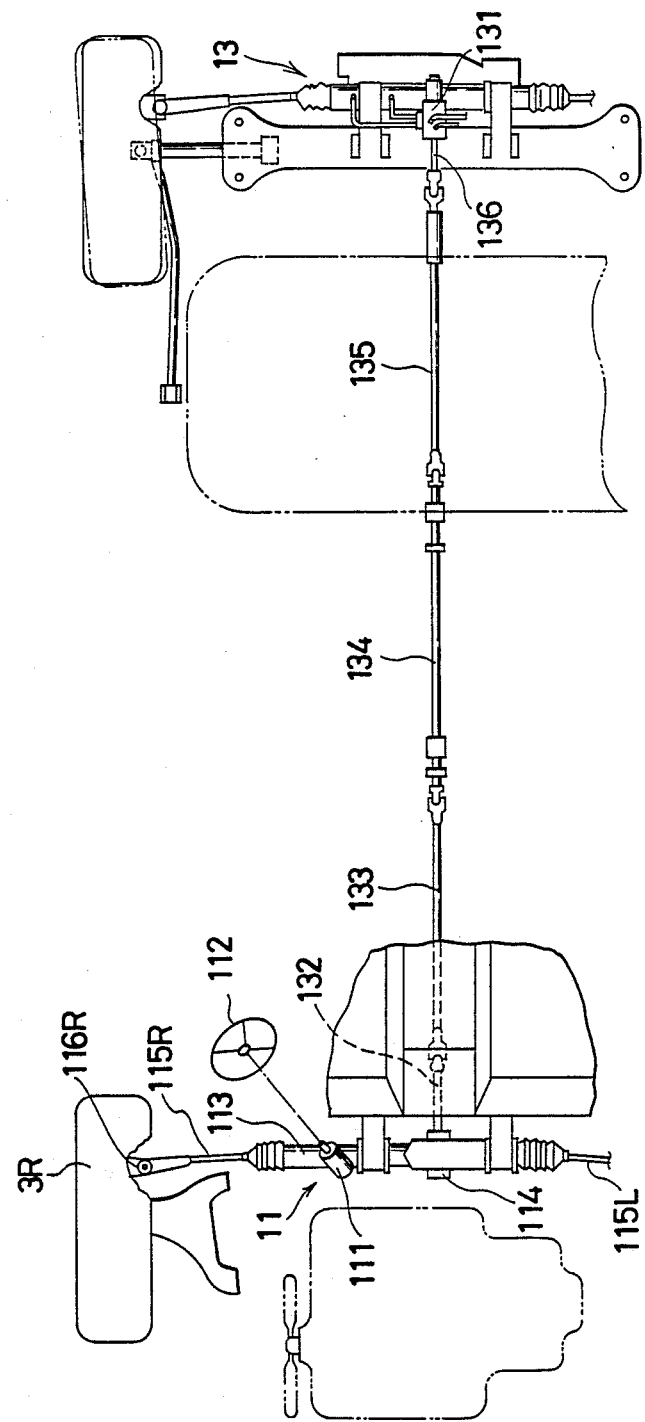
FIG. 2 shows a steering system of the vehicle body assembly of FIG. 1.
Figure 3:
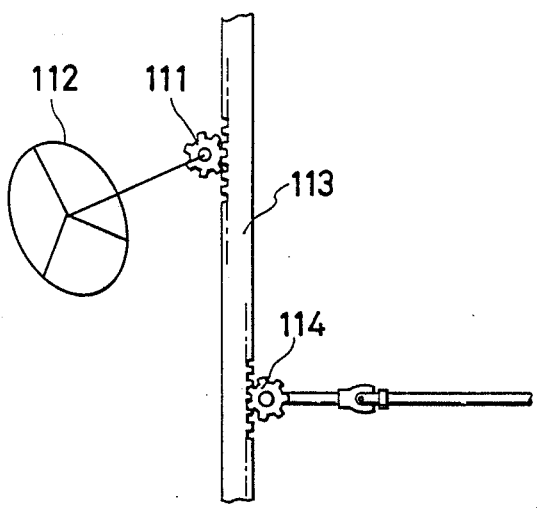
FIG. 3 shows part of the front steering mechanism of the steering system in FIG. 2.
Figure 4:
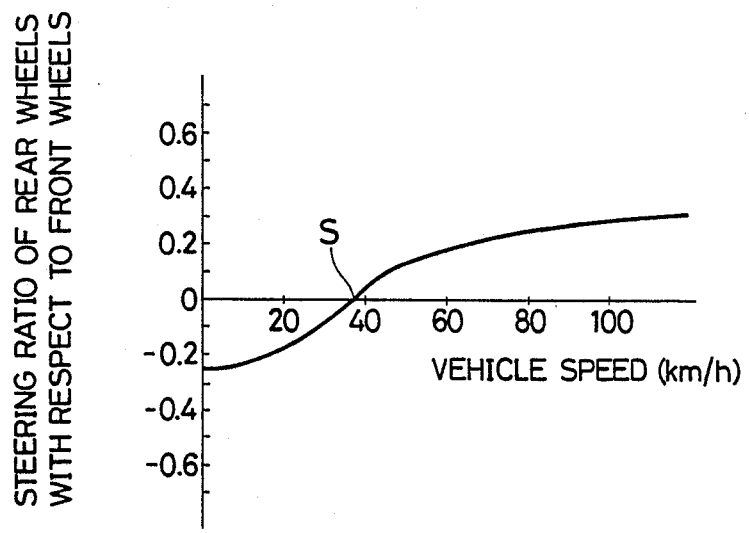
FIG. 4 illustrates steering characteristics of the steering system show in FIG. 2.

Referring now to FIGS. 1, 2 and 3, a four-wheel steering mechanism 9 of the present 4-WS vehicle will be described. The steering mechanism 9 comprises a front steering mechanism 11 and a rear steering mechanism 13. The front steering mechanism 11 for steering the front wheels 3L, 3R has the same construction as in the original 2-WS vehicle shown in FIG. 5 except that the steering ratio is lower than the original one. The front steering mechanism 11 has a pinion gear 111 rotated by a steering wheel 112 and a rack 113 for converting rotational motion of the pinion 111 into linear motion. The ends of the rack 113 are connected with tie-rods 115L, 115R which in turn are connected with knuckle arms 116L, 116R, respectively. By operating the steering wheel 112 the front wheels can be steered by the above-mentioned mechanism. The rear steering mechanism 13 for the rear wheels is mounted on the cross-member 53 and is provided with a power steering means 131. The front and rear steering mechanisms are connected with each other via a pinion gear 114 and shafts 132, 133, 134, 135. The pinion gear 114 is connected axially with the front shaft 132 and transfers the linear motion of the rack 113 to a rotational motion of the shaft 132. The said shafts are connected with universal joints, and the rear shaft 135 is connected with a steering shaft 136 also via a universal joint. The operation of the steering wheel 112 is transferred through the front steering mechanism, the shafts 132, 133, 134, 135 and the shaft 136 to the rear wheels, so that the steering of the rear wheels is defined by a predetermined ratio with respect to the front wheels. According to the present steering mechanism the steering ratio of the rear wheels with respect to the front wheels is defined as shown in FIG. 4. As can be seen from FIG. 4, the rear wheels are steered in the opposite direction to the front wheels where the vehicle speed is lower than S, whereas they are steered in the same direction as the front wheels where the running speed exceeds S. A mechanism and a control system for carrying out this kind of steering operation are apparent for a person ordinarily skilled in the art and it is not necessary to describe details thereof for the present invention. For example, such a steering mechanism and control system are disclosed in the U.S. Pat. Nos. 4,610,328 and 4,601,357, which are incorporated here by reference.

Figure 11A:
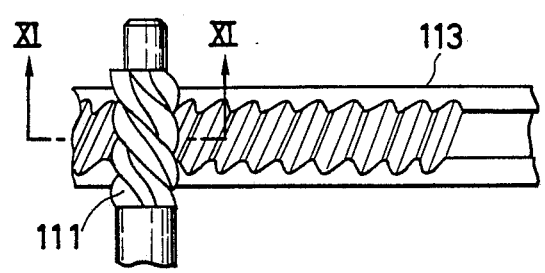
FIG. 11A is a plan view illustrating a rack and a pinion gear of a front steering mechanism in FIG. 1.
Figure 11B:
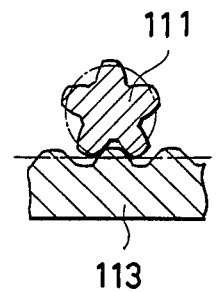
FIG. 11B is a sectional view taken along XI—XI in FIG. 11A.
Figure 12A:
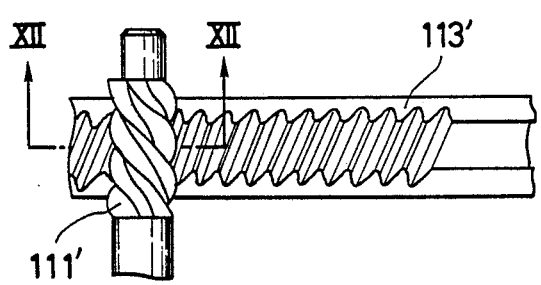
FIG. 12A is a plan view illustrating a rack and a pinion gear of a front steering mechanism in FIG. 5.
Figure 12B:
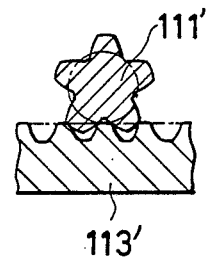
FIG. 12B is a sectional view taken along XII—XII in FIG. 12A.

In the present 4-WS vehicle a gear ratio of the rack 113 to the pinion gear 111 is set to be smaller than that in the original 2-WS vehicle. As shown in FIGS. 11 and 12, the number of teeth of the pinion gears 111 and 111' are the same, while that of the rack 113 is set to be smaller than that of the rack 113'. Thus, for the same amount of operation of the steering wheel the front wheels of the 4-WS vehicle are steered by a greater amount than those of the 2-WS vehicle. According to the present front steering mechanism, the 4-WS vehicle can be handled in the same manner as the 2-WS vehicle when turning at high speed.

In the above example, the lateral rigidity of the front suspension system 1 is increased by adding the additional member 34. The rigidity can also be increased by having the sub-frame 31 comprised of thicker members, as shown in FIG. 6B, than the original one shown in FIG. 6A. Alternatively, the sub-frame 31 may be comprised of members having a larger closed sectional area as shown in FIG. 6C, so that it has a larger lateral rigidity than a sub-frame comprised of members having a smaller closed sectional area as shown in FIG. 6A. Or, the rigidity can be increased by modifying the rubber bushing means 36 interposed between the suspension arm 35 and the longitudinal member 32. For example, rubber bushing means 36' provided in the original front suspension system shown in FIG. 5 may be comprised of solid rubber bushing members 361' as shown in FIG. 7A, whereas the rubber bushing means 36 in the front suspension system in the 4-WS vehicle as shown in FIG. 1 may be comprised of a rubber bushing member 361 which has a pair of curved portions 362 inserted therein in the laterally opposite direction with respect to the center of the rubber bushing member. The curved portions 362 are harder than the rubber bushing member 361 in terms of resiliency, by which the rubber bushing means 36 exhibits harder resilient characteristics than the rubber bushing means 36'. Hence the front suspension system having the rubber bushing means 36 is provided with a higher lateral rigidity than the original front suspension system in the 2-WS vehicle.

Figure 9:
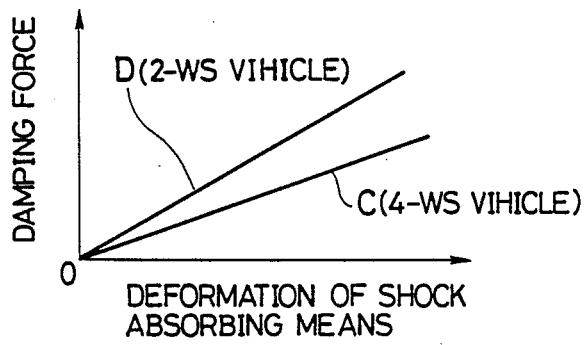
FIG. 9 illustrates damping properties of shock absorbing means.
Figure 10:
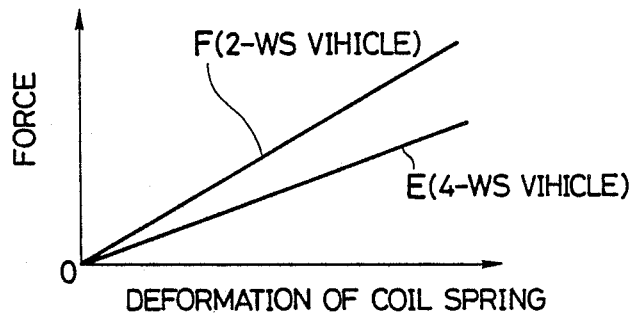
FIG. 10 illustrates resilient characteristics of suspension coil spring means.

The rigidity against rolling of the front suspension system in the above example may be decreased by lowering the spring constant of the stabilizer 40. Alternatively, the damping force of the shock absorber 381 or the spring constant of the coil spring 39 may be lowered to obtain a lower rigidity against rolling. In FIG. 9, line C shows an example of the damping properties of the shock absorber 381 in the 4-WS vehicle, and line D that of the shock absorber 381' in the 2-WS vehicle. Similarly, in FIG. 10, line E shows an example of the resilient properties of the coil spring 39 in the 4-WS vehicle, and line F that of the spring 39' in the 2-WS vehicle.

We claim:

1. A method of adjusting a characteristic of a suspension system contained in a vehicle body assembly which is adapted to be used in common for a two-wheel-steering vehicle and a four-wheel-steering vehicle, characterized by when a front suspension system of said suspension system is installed in a four-wheel-steering vehicle, said front suspension system is set to have a lateral rigidity which is higher than that of said front suspension system installed in a two-wheel-steering vehicle.

2. The method of adjusting a characteristic of a suspension system as set forth in claim 1, wherein said front suspension system comprises a sub-frame construction whose rigidity is increased when installed in a four-wheel-steering vehicle so that said front suspension system can exhibit a higher lateral rigidity.

3. The method of adjusting a characteristic of a suspension system as set forth in claim 2, wherein said sub-frame construction comprises a pair of longitudinal members supporting suspension arms of front wheels and a lateral member connecting said longitudinal members with each other, and said sub-frame construction is provided with an additional lateral member connecting said longitudinal members when it is installed in a four-wheel-steering vehicle to thereby increase the lateral rigidity of said front suspension system.

4. The method of adjusting a characteristic of a suspension system as set forth in claim 2, wherein said sub-frame construction comprises a plurality of members at least one of which is comprised of a thicker plate when installed in a four-wheel-steering vehicle than when installed in a two-wheel-steering vehicle, so that the lateral rigidity of said front suspension system installed in a four-wheel-steering vehicle is increased.

5. The method of adjusting a characteristic of a suspension system as set forth in claim 2, wherein said sub-frame construction comprises at least one member having a closed cross-section, said closed cross-section being large when said member installed in a four-wheel-steering vehicle so as to increase the lateral rigidity of said front suspension system.

6. The method of adjusting a characteristic of a suspension system as set forth in claim 1, wherein said front suspension system comprises rubber bushing means disposed between suspension arms swingably supporting front wheel and vehicle-body-side members, and said rubber bushing means being set to exhibit harder resilient characteristics with respect to lateral force when installed in a four-wheel-steering vehicle.

7. The method of adjusting a characteristic of a suspension system as set forth in claim 1, wherein said suspension system when installed in a four-wheel-steering vehicle is set to exhibit a rigidity against rolling of the vehicle body which is lower than that it is when said suspension is installed in a two-wheel-steering vehicle.

8. The method of adjusting a characteristic of a suspension system as set forth in claim 7, wherein a front suspension system of said front suspension system when installed in a four-wheel-steering vehicle is set to exhibit a rigidity against rolling of the vehicle body which is lower than it is when said suspension is installed in a two-wheel-steering vehicle.

9. The method of adjusting a characteristic of a suspension system as set forth in claim 8, wherein said front suspension system comprises a stabilizing means which when installed in a four-wheel-steering vehicle is set to have a spring constant which is lower than it is when it is installed in a two-wheel-steering vehicle.

10. The method of adjusting a characteristic of a suspension system as set forth in claim 8, wherein said front suspension system comprises coil spring means disposed between an upsprung member of the vehicle containing front wheels and a vehicle body, and wherein said coil spring means when installed in a four-wheel-steering vehicle are set to have a spring constant which is lower than it is when said means are installed in a two-wheel-steering vehicle.

11. The method of adjusting a characteristic of a suspension system as set forth in claim 8, wherein said front suspension system comprises shock absorbing means disposed between an upsprung member of the vehicle containing front wheels and a vehicle body, and when installed in a four-wheel-steering vehicle said shock absorbing means being set to exhibit a damping force which is lower than it is when said absorbing means are installed in a two-wheel-steering vehicle.

12. A front suspension system in a vehicle body construction used in common for a two-wheel-steering vehicle and a four-wheel-steering vehicle, characterized in comprising a sub-frame construction for supporting suspension arms, said sub-frame construction when installed in a four-wheel-steering vehicle being provided with an additional member so that said front suspension system has a lateral rigidity which is higher than it is when installed in a two-wheel-steering vehicle.

13. The front suspension system as set forth in claim 12, wherein said sub-frame construction comprises a pair of longitudinal members supporting said suspension arms for front wheels and a lateral member connecting said longitudinal members with each other, said sub-frame construction being provided with said additional member extending laterally to connect said longitudinal members with each other.

14. The method of adjusting a characteristic of a suspension system as set forth in claim 1, wherein said commonly used vehicle system further includes front steering mechanism for front wheels which when installed in a four-wheel-steering vehicle is set to have a steering ratio which is smaller than that when installed in a two-wheel-steering vehicle.

15. A suspension system in a vehicle body construction which is used in common for a two-wheel-steering vehicle and a four-wheel-steering vehicle, characterized in that its rigidity against rolling of the vehicle body when installed in a four-wheel-steering vehicle is set to be lower than it is when installed in a two-wheel-steering vehicle.

* * * * *